Aug. 18, 1959  L. GACK  2,899,870
METAL PLANING OR SHAPING MACHINE
Filed June 14, 1955  4 Sheets-Sheet 1

INVENTOR.
Ludwig Gack
BY Michael S. Striker
Attorney

Aug. 18, 1959     L. GACK     2,899,870
METAL PLANING OR SHAPING MACHINE
Filed June 14, 1955     4 Sheets-Sheet 2

INVENTOR.
Ludwig Gack
BY Michael S. Striker
Attorney

United States Patent Office 2,899,870
Patented Aug. 18, 1959

2,899,870

METAL PLANING OR SHAPING MACHINE

Ludwig Gack, Muhlacker, Germany

Application June 14, 1955, Serial No. 515,409

Claims priority, application Germany June 16, 1954

11 Claims. (Cl. 90—39)

The present invention relates to a metal planing or shaping machine in which the reciprocating driving motion is produced by means of an adjustable crank and a rocker arm, and by means of which it is possible first to carry out a straight cut during the forward stroke of the machine, and then to swivel the tool holder thereof so as to cut a groove or fillet during the first part of the return stroke.

Since in planers or shapers of this type which were known prior to this invention every adjustment of the stroke length of the tool slide also required a new adjustment of the groove cutting mechanism, it is the principal object of the present invention to provide a machine which obviates such necessity for a separate adjustment of the groove cutting mechanism.

According to the present invention, the customary crankpin for reciprocating the tool slide is associated with a second crankpin which is adjustable simultaneously and together with the first crankpin and within the same radial guideway of a gate-type disk. Through an intermediate connecting rod, such second crankpin is designed to move a cam plate in such a manner that at any desired stroke length of the tool slide and within a portion of the return stroke of the tool slide which is always of the same length, the cam plate will always turn about an angle of the same size, the sector of which extends into a cam portion which acts upon an element which turns the tool holder so that separate adjustments of the groove cutting mechanism will no longer be necessary.

Further objects, features, and advantages of the present invention will be apparent from the following detailed description thereof which is to be read particularly with reference to the accompanying drawings, in which Fig. 1 shows diagrammatically a vertical cross section through the planing or shaping machine according to the invention, such section being taken in a direction transverse to the direction of movement of the tool slide and illustrating the lowermost position of the crank pins;

Fig. 4 shows a cross section similar to Fig. 3 but illustrates another position of adjustment of the stroke of the tool slide in which the tool slide performs its minimum stroke; while

Figure 1:
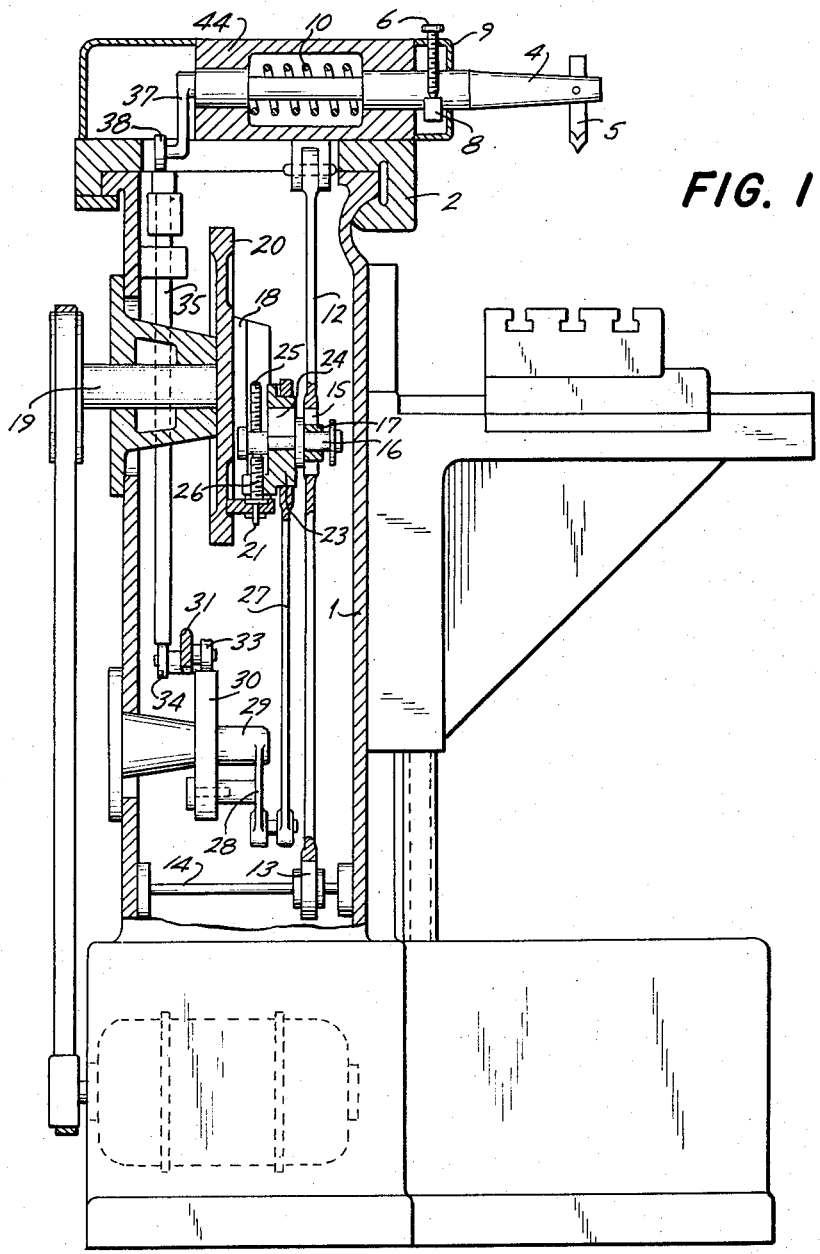
Figure 2:
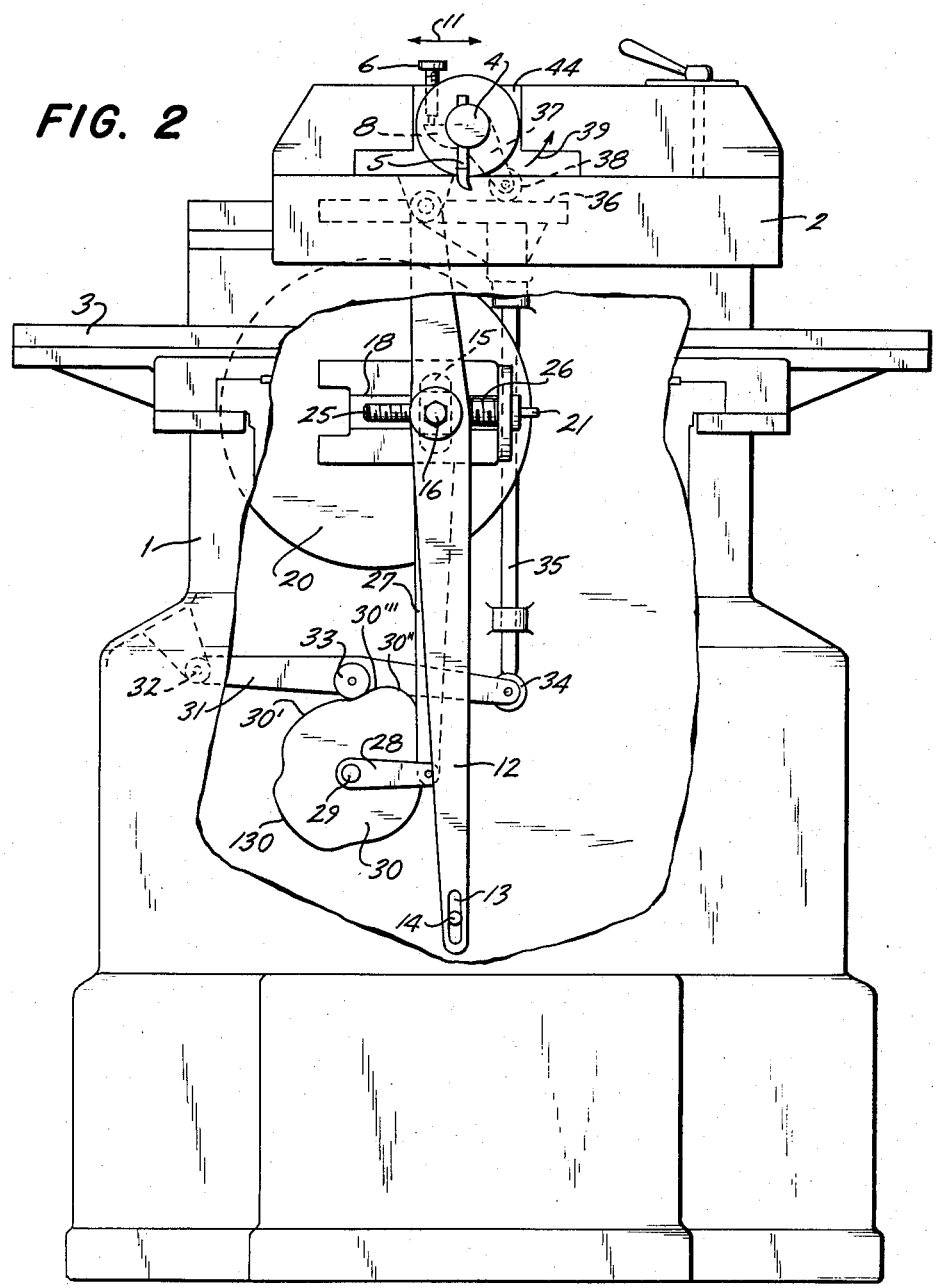
Fig. 2 shows a front view of the planing machine illustrating the crank pins in the dead center position in which the slide has finished its straight working stroke, and starts its return stroke, the machine being adjusted to maximum stroke.

Referring to the drawings, the upright 1 of the machine supports the tool slide 2 which is mounted thereon so as to be movable in a horizontal direction. The machine table on which the workpiece is to be mounted is adjustable in a horizontal direction along the horizontal knee table 3, while the table 3 itself is adjustable in a vertical direction on the machine upright 1. The tool holder 4 in which the tool 5 is mounted in the usual manner is vertically disposed to the direction of movement of the tool slide 2 and rotatably mounted therein. The tool holder 4 is provided with a cam plate 8 which is rotatable therewith, the extent of such rotation being limited by a stop 6. Cam 8 and stop 6 are preferably disposed within a housing 9 mounted on the front side of the tool slide. Stop 6 is adjustable and may, for example, consist of an adjusting screw, as shown in Figs. 1 and 2. Intermediate its bearings within the tool slide 2, the tool holder 4 is acted upon by a spring 10 which has the tendency to turn the same to maintain it in the operative position shown in Figs. 1 and 2 in which cam 8 abuts against the stop 6, or to turn it automatically back into such position so that the tool 5 will point vertically downward.

Figure 3:
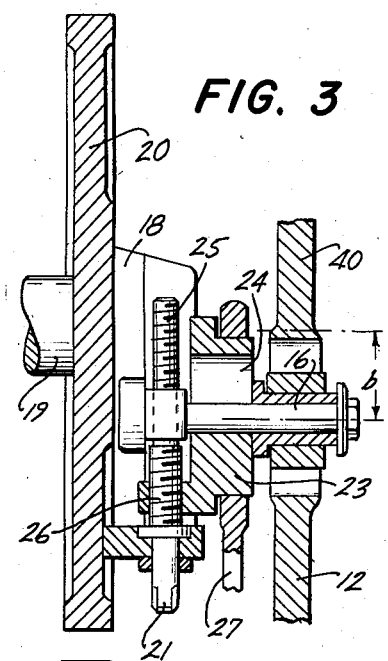
Fig. 3 shows a cross section taken along the guideway of the two crankpins within the gate-type disk and illustrates one position of adjustment of the stroke of the tool slide in which the tool slide performs its maximum stroke.
Figure 6:
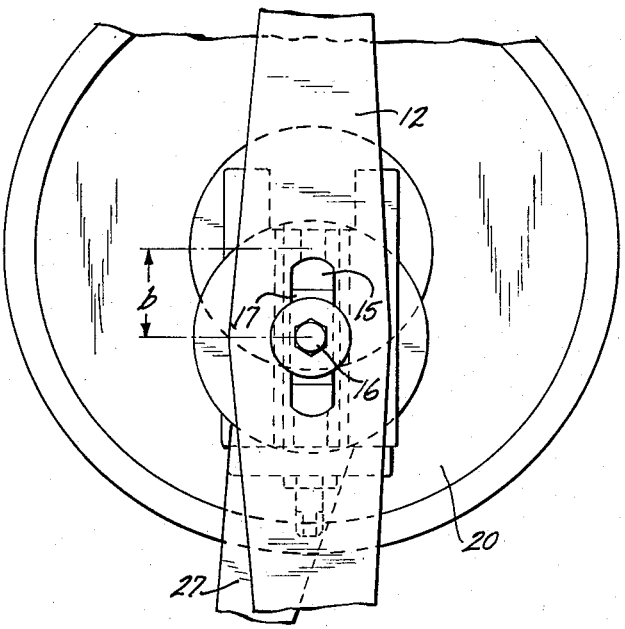
Figs. 6 and 7 are axial views associated respectively with Figs. 3 and 4.
Figure 4:
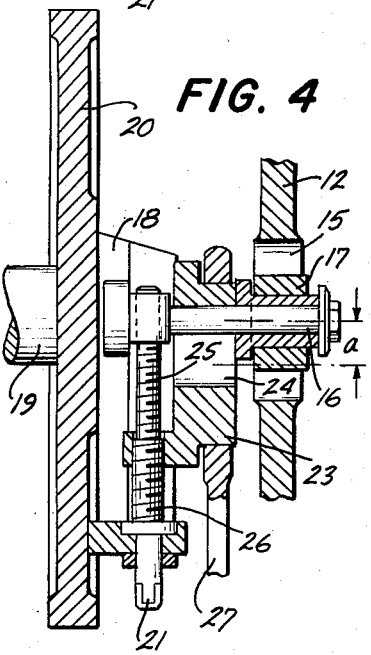
Figure 7:
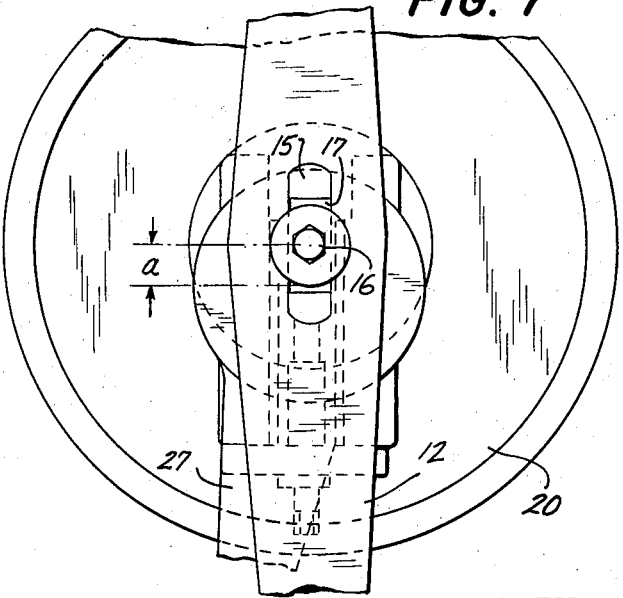
Figure 5:
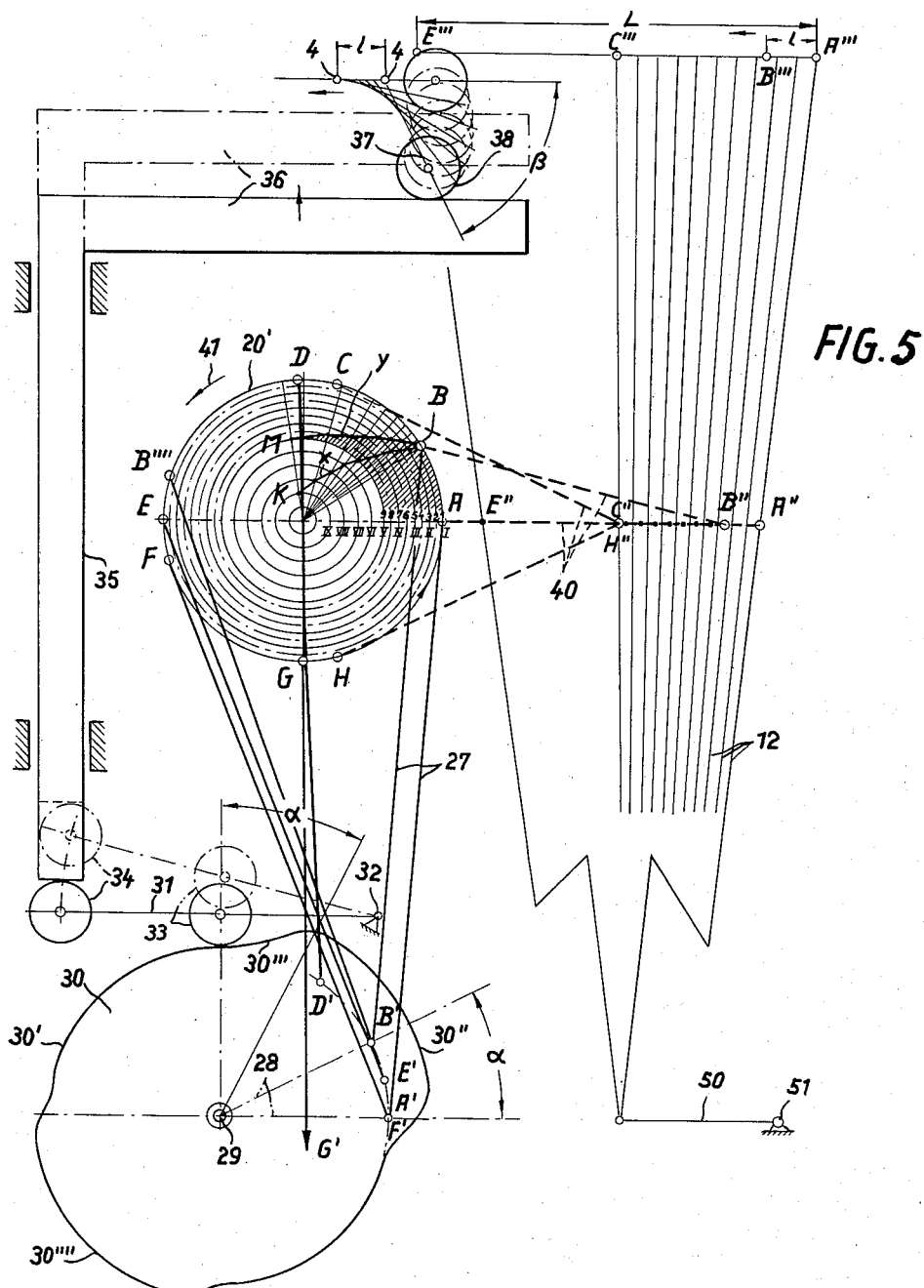
Fig. 5 shows a diagram illustrating the operation of the groove cutting mechanism.

The horizontal reciprocating movement of tool slide 2, as indicated by the arrow 11 in Fig. 2, is obtained by means of a rocker arm 12 which is connected thereto and may be provided near its lower end with a slot 13 by means of which it is either slidably mounted on a stationary pivot 14, or, as illustrated in Fig. 5, on a connecting rod 40. Further upwardly, rocker arm 12 is provided with a guide slot 15 in which a crankpin 16 engages by means of a sliding block 17. Crankpin 16 is mounted in a radial guideway 18 on a gate-type disk 20 which is mounted on the main drive shaft 19 and within which it may be adjusted by means of an upper threaded part 25 of a spindle 21, as shown in Figs. 3 and 4, which is mounted on the disk 20 so as to be rotatable but non-slidable relative thereto. Fig. 3 illustrates the outer position of the crankpin 16 resulting in the longest stroke of the tool slide 2, while Fig. 4 illustrates the inner end position of crankpin 16 in which the stroke of slide 2 is zero.

The same radial guideway 18 of the gate-type disk 20 also supports a second crankpin 23 which is likewise adjustable therein by the spindle 21. However, crankpin 23 has a larger diameter than crankpin 16 and is provided with an eccentrical aperture 24 which extends parallel to the guideway 18 and allows the crankpin 16 to pass therethrough, thus permitting the axes of the two crankpins 16 and 23 to be adjusted relative to each other. The upper part 25 of spindle 21 which serves to adjust the crankpin 16 preferably has a larger pitch than the lower part 26 which serves to adjust the crankpin 23. In the embodiment of the invention as illustrated in the drawings, the pitch of the threaded part 25 is made twice as large as that of the threaded part 26. The effect of such difference in pitch between the two parts 25 and 26 of the spindle 21 is that when the latter is turned, crankpin 16 is shifted to a greater extent than crankpin 23, the arrangement preferably being such that when crankpin 16 which moves the tool slide 2 is in its outer position as shown in Fig. 3, so as to effect the longest stroke thereof, the axes of both crankpins 16 and 23 coincide. When the two crankpins are shifted radially inwardly, as shown in Fig. 4, crankpin 16 will be moved further inwardly than crankpin 23 so that the axes of the two crankpins will then be spaced apart at a distance $a$.

The second crankpin 23 carries a connecting rod 27 which extends in a substantially downward direction, with its free lower end engaging with a crank arm 28. Shaft 29 of the crank arm 28 carries a cam plate 30. Above cam 30 and extending in a substantially horizontal direction is a rocker arm 31, the left end of which, as shown in Fig. 2, is mounted on the upright support so as to be turnable about a stationary pivot 32 on the upright 1. The rocker arm 31 carries intermediate its ends a roller 33 which engages the peripheral surface of the cam 30, while the free end of rocker arm 31 carries a roller 34 which engages the lower end of a rod 35 which is mounted on the upright 1 so as to be movable in a vertical direction. Rod 35 carries on its upper end a horizontal guide rail 36. A roller 38 is mounted on the free end of a lever 37 which is secured to the rear end of the tool holder 4 and turns with the same. As long as the guide rail 36 is disposed in its lowest position as shown in Fig. 2, tool holder 4 will remain in its normal working position in which through the action of spring 10, the cam 8 abuts against the stop 6. In this position, roller 38 of rocker arm 37 is preferably slightly spaced away from the guide rail 36 or just lightly engages the same. If the guide rail 36 is lifted by the cam 30 acting upon the rocker arm 31 and the rod 35 (see Fig. 5), it will engage roller 38 and pivot the lever 37, thereby turning the tool holder 4 and the tool 5 in the direction shown in Fig. 2 by the arrow 39. As soon as the guide rail 36 is again lowered, spring 10 will automatically return the tool holder 4 with lever 37 and the tool 5 to their original position in which cam 8 abuts against the stop 6. The return of lever 37 and tool holder 4 is possible since the roller 38 moves downwardly with rail 36.

The operation of the machine as previously described shall now be further explained with reference to the diagram shown in Fig. 5. It shall first be assumed that crankpin 16 which reciprocates the tool slide 2, and crankpin 23 which moves the cam 30 are in their starting position as shown in Fig. 3, in which their axes coincide and the tool slide 2 carries out its longest stroke. For a better illustration, Fig. 5 shows the point of engagement A'' of the crankpin 16 on the rocker arm 12 of the tool slide as being shifted laterally outwardly by means of an intermediate that the disk 20 rotates in the direction as shown by the arrow 41, it will be seen that at one half revolution of crankpin 16 from the point A via B and C to the point E in accordance with the pivotal movement of the rocker arm from the point A'' via B'' and C'' toward E'', tool slide 2 will then carry out its longest stroke L extending from the point A''' via B''' and C''' to the point E'''. During such movement of crankpin 16 from A to E, tool slide 2 carries out its return stroke, while the working stroke is carried out when the crankpin 16 moves from the point E via H to the point A. During the distance of travel $l$ at the beginning of the return stroke of the tool slide 2 from the point A''' to point B''' corresponding to the distance of travel of the crankpin 16 from the point A to the point B, the shaper tool is to be swiveled outwardly for cutting a groove or fillet. Assuming that the crankpin 16 is in its outer end position in which it is coaxial with the crankpin 23 which moves the cam 30, points A, B, C, D, and E along the outer arc also apply to crankpin 23. During its movement from the point A via B, D, E, F, and G back to the point A, crankpin 23 imparts an angular movement to the lever 28 and the cam 30 through the connecting rod 27. The respective positions of the point of engagement of the connecting rod 27 on the lever 28 or the cam 30, respectively, are indicated by the points A', B', D', E', F', and G'. As cam 30 turns, it acts on the cam follower roller 33, pivots lever 31 about pivot 32 and raises members 35, 36 through roller 34. Thereby lever 37 is turned by roller 38 and turns the tool holder 4 with tool 5 to cut a fillet while the tool holder 4 moves the distance $l$. During such travel of the tool holder 4, the roller 38 rolls on rail 36.

As already stated, the ratio of the pitch of the screw thread of parts 25 and 26 of the spindle 21 is to be 2:1 when spindle 21 is turned to reduce the length of the stroke of tool slide 2, crankpin 16 which moves tool slide 2 will move twice as far inwardly within the guideway 18 as crankpin 23 which turns the cam 30. Fig. 5 illustrates different positions $A_1$ to $A_9$ of crankpin 23 at the beginning of the return stroke of tool slide 2 starting from the outer position at the point A, while the corresponding positions of the crankpin 16 are indicated by the points A–I to A–IX. Connecting rod 27 preferably engages the lever 28 or cam 30, respectively, at a point which at the beginning of the return stroke of tool slide 2, that is, at the position A', is disposed approximately at the middle below the route between the corresponding adjustments 1 to 9 of the crankpin 23. In such arrangement, the position of the point of engagement A' will practically remain unchanged when crankpin 23 will be adjusted between points $A_1$ to $A_9$. Cam 30 therefore always assumes the same position at the beginning of the return stroke of tool slide 2. Cam 30 is further disposed and shaped so that when the point of engagement of connecting rod 27 is shifted from the point A' to the point B' corresponding to the angle $\alpha$, and cam 30 is thus turned away from such position at the beginning of the return stroke of slide 2, it will lift guide rail 36 through the rocker arm 31 and the rod 35 so as to turn the tool holder 4 and swivel the tool 5. During this time, that is, at the beginning of the return stroke, slide 2 and tool holder 4 travel the distance $l$ within which rail 36 acts upon the roller 38 to pivot lever 37 as well as the tool 5 about the angle $\beta$ so that the groove or fillet may be cut.

It will thus be seen that the angular movement of crankpin 16 which corresponds to the return stroke $l$ differs at every different adjustment of crankpin 16 or at the various adjustments of the stroke of the slide 2, respectively. The positions which correspond to the positions A–I to A–IX of the crankpin 16 after traveling the distance $l$ lie within a curve $x$ between the points B and K. The respective positions of the crankpin 23 lie within a curve $y$ between the points B and M. Since the ratio of adjustment of the two crankpins 16 and 23 were chosen to be 2:1, curve $y$ will extend in a direction substantially parallel to the line which contains the initial crank positions A–I to A–IX at the beginning of the return stroke of slide 2. Therefore, when crankpin 23 moves from the initial positions $A_1$ to $A_9$ up to curve $y$ within the shaded area in Fig. 5, cam 30 will always be turned from the constant initial position A' about the same angular distance $\alpha$ independently of the adjustment of the stroke of slide 2, while the latter will then always travel the distance $l$. At any desired length of the stroke L of the tool slide 2 along a portion $l$ of the return stroke which always remains of equal length, the cam 30 therefore always carries out a movement about the same pivoting angle $\alpha$, during which it exerts a turning action upon the tool holder 4. An adjustment of the stroke of tool slide 2 therefore never requires any adjustment of the groove cutting mechanism.

The ratio of adjustment of crankpins 16 and 23 for obtaining the conditions as mentioned above wherein curve $y$ extends substantially parallel to the initial crank positions A–I to A–IX at the beginning of the return stroke of slide 2, depends entirely upon the prevailing leverages and may thus deviate considerably from the ratio 2:1 as assumed in the example stated above.

The control cam 30 for operating the groove cutting mechanism is designed so that after passing the distance A'—B' during which time the groove will be cut, it will hold the tool 5 during the return stroke movement of the disk 20 to the point B''' in a position in which it is tilted away from the workpiece and will only permit it to be tilted to the working position during the remainder of the return stroke of slide 2 from the point B''' to E as well as at the beginning of the working stroke from the point E to the point F so that there will be practically no loss of travel of slide 2 which might be caused by tilting back the tool 5.

Since at any time only a portion D', G' of the periphery of cam 30 is used for controlling the operation of the tool 5, it is possible to mount the cam 30 so as to be adjustable on its shaft 29, permitting it to be turned to and secured in different working positions in which the tool 5 may carry out smaller or larger tilting movements in accordance with the difference in curvature of cam 30. The latter may, for example, also be designed so that after being shifted about an angle of 180° relative to the lever 28 it will during the return stroke of slide 2 tilt the tool 5 only a few angular degrees away from the surface of the workpiece to be worked upon so as not to cut any groove or fillet. The machine operates in the following manner:

When drive shaft 19 is rotated, rocker arm 12 is reciprocated by crank pin 16 and reciprocates tool slide 2 with tool holder 4 and the cutting tool 5. At the same time, crank pin 23 oscillates connecting rod 27 and thereby arm 28 and cam 30 so that tool holder 4 is turned through members 33, 34, 35, and rail 36 acting on lever 37. As explained above, the angular displacement of tool holder 4 will take place at the beginning of the return movement of tool slide 2 when tool 5 is at the end of a groove cut during the forward movement of slide 2. When tool holder 4 turns during the first part of the return movement of slide 2, cutting tool 5 moves along the circular path out of the just cut groove and will cut an arcuate fillet at the end of the cut groove. Adjustment of the length of the rectilinear stroke of slide 2 results in rectilinear cuts of different length, but the angle through which tool holder 4 turns remains the same so that the arcuate fillet at the end of the groove is accurately cut to the desired shape without any further adjustment.

The shaper or planer as above described may also be utilized as a grinder, in which case it is only necessary to exchange the rotatable tool holder 4 for a grinding spindle, while the mechanism for the slide movement remains unchanged. The driving movement of the grinding spindle is preferably carried out by means of a separate driving belt.

Since the mechanism for swiveling the shaping or planing tool 5 is not permanently in engagement and coupled with the rotatable tool holder 4, it is a very simple matter to exchange the latter for a grinding spindle. The machine is provided for this reason with a guide rail 36 which may be raised and lowered and along which the roller 38 of a rocking lever 37 which is mounted on the rotatable tool holder 4 is permitted to slide. Guide rail 36 and rocking lever 37 are always placed automatically into the proper position relative to each other when the planing mechanism is mounted thereon. Since the sliding movement of slide 2 is also required for grinding, only the raising and lowering movement of the guide rail 36 for swiveling the tool holder 4 will be rendered ineffective.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A metal planing and shaping machine comprising a tool slide, a tool holder rotatably mounted within said tool slide, a rotatable member, means for driving said member, a crankpin adjustably mounted on said member, a rocker arm mounted on said tool slide and connected to said crankpin for reciprocating said tool slide, a second crankpin adjustably mounted on said rotatable member, means connected to said crank pins for simultaneously adjusting both of said crankpins in a radial direction of said rotatable member and relative to each other, a cam plate rotatably mounted on said machine, a connecting rod mounted on said second crankpin and connected to said cam plate for turning the same so that, regardless of the length of the entire stroke of said tool slide, said cam plate always turns about an angle of the same size within a portion of the return stroke of said tool slide which is of constant length, said angle enclosing a portion of said cam plate, and means for turning said tool holder about its axis, said cam portion being connected to said turning means to turn said tool holder so that a tool mounted in said tool holder after completing a straight cutting stroke will be swiveled toward one side so as to cut a groove at the beginning of the return stroke of said tool slide.

2. A metal planing and shaping machine as defined in claim 1, wherein said means for adjusting both of said crankpins comprise a single spindle having two sections with screw threads thereon having a different pitch from each other, the section having the larger pitch being adapted to adjust the crankpin controlling the reciprocating movement of said tool slide, and the section having the smaller pitch being adapted to adjust the crankpin controlling the movement of said tool holder for cutting a groove independently of the reciprocatory movement of said tool slide.

3. A metal planing and shaping machine as defined in claim 2, wherein said rotatable member comprises a guideway, both of said crankpins being mounted in said guideway so as to be adjustable in a radial direction of said guideway.

4. A metal planing and shaping machine as defined in claim 2, wherein said rotatable member comprises a plate having a guideway therein, both of said crankpins being slidably mounted in said guideway so as to be adjustable in a radial direction of said plate, one of said crankpins having an aperture therein, the other crankpin extending through said aperture and being adjustable therein within the width thereof.

5. A metal planing and shaping machine as defined in claim 1, further comprising a guide rail extending parallel to the direction of movement of said tool slide, and mounted so as to be movable in a direction substantially vertical to the direction of movement of said tool slide, said cam plate being adapted to move said guide rail in said vertical direction, and a lever mounted on said tool holder and engaging said guide rail, so that the movements of said guide rail are transmitted through said lever to turn said tool holder and swivel said tool therein.

6. A machine as defined in claim 1 and including a shaft means for supporting said cam plate in a plurality of angularly displaced positions in which said cam plate turns with said shaft means so that said cam plate by means of the difference in curvature thereof is capable of controlling said tool holder so as to carry out different turning movements, said shaft means being connected to said connecting rod and turned by the same with said cam plate.

7. A metal planing and shaping machine as defined in claim 1, wherein the point of connection of said connecting rod of said second crankpin with said cam plate is disposed at the beginning of the return stroke of said tool slide relative to the initial position of said second crankpin so that when the stroke of said tool slide is being adjusted, said point of connection will remain substantially unchanged, so that the beginning of the groove cutting operation will remain substantially unchanged by the adjustment of the stroke of said tool slide, the axes of said two crankpins substantially coinciding when said first crankpin which is adapted to move said tool slide is in its outer position corresponding to the largest stroke of said tool slide, the extent of the radial adjustment of said second crankpin acting upon said connecting rod being smaller than that of said first crankpin acting upon said tool slide so that when said first crankpin is adjusted to a smaller stroke of said tool slide, said second crankpin will move a still smaller distance inwardly, whereby the positions of said second crankpin, which lie within the same stroke section which is disposed at the beginning of the return stroke of said tool slide and is provided for swiveling said tool outwardly, lie for all stroke adjustments of said tool slide on a curve which extends substantially parallel to the initial position of said crankpin, so that within such section of the return stroke of said tool slide said cam plate is always turned independently of the adjustment of the stroke of said tool slide and about substantially the same angular distance which is provided for swiveling said tool.

8. In a machine tool, an adjusting arrangement comprising, in combination, a tool slide; a tool holder turnably mounted on said tool slide; a driven rotary member; a first crank pin mounted on said rotary member for movement in radial direction; a rocker arm connected to said tool slide and to said first crank pin whereby said tool slide is reciprocated during rotation of said driven rotary member a distance depending on the position of said first crank pin; a second crank pin mounted on said rotary member for movement in radial direction; turnable cam means; means connecting said second crank pin with said cam means for turning said cam means through an angular distance depending on the position of said second crank pin during turning of said rotary momber; means connecting said cam means with said tool holder for turning the same depending on the turning angle of said cam means; and control means connected to said first and second crank pin for simultaneously moving said crank pins relative to each other and in radial direction of said rotary member for selected distances having such a ratio that said cam means turns through the same angular distance during a constant portion of the return stroke of said tool slide for cutting a fillet by a tool mounted on said tool holder after the tool has completed a straight cutting stroke moving with said tool slide.

9. In a machine tool, an adjusting arrangement comprising, in combination, a tool slide; a tool holder turnably mounted on said tool slide; a driven rotary member; a first crank pin mounted on said rotary member for movement in radial direction; a rocker arm connected to said tool slide and to said first crank pin whereby said tool slide is reciprocated during rotation of said driven rotary member a distance depending on the position of said first crank pin; a second crank pin mounted on said rotary member for movement in the same radial direction as said first crank pin, the axes of said first and second crank pins coinciding in the outermost positions of said crank pins, and said first crank pin in its innermost position being located inwardly of said second crank pin in the innermost position of the same; turnable cam means; means connecting said second crank pin with said cam means for turning said cam means through an angular distance depending on the position of said second crank pin during turning of said rotary member; means connecting said cam means with said tool holder for turning the same depending on the turning angle of said cam means; and control means connected to said first and second crank pins for simultaneously moving said crank pins relative to each other and in radial direction of said rotary member between the respective outermost and innermost positions of said crank pins and for selected distances having such a ratio that said cam means turns through the same angular distance during a constant portion of the return stroke of said tool slide for cutting a fillet by a tool mounted on said tool holder after the tool has completed a straight cutting stroke moving with said tool slide.

10. In a machine tool, an adjusting arrangement comprising, in combination, a tool slide; a tool holder turnably mounted on said tool slide; a driven rotary member; a first crank pin mounted on said rotary member for movement in dial direction; a rocker arm connected to said tool slide and to said first crank pin whereby said tool slide is reciprocated during rotation of said driven rotary member a distance depending on the position of said first crank pin; a second crank pin mounted on said rotary member for movement in the same radial direction; turnable cam means; connecting rod means having one end turnably mounted on the second crank pin and the other end pivotally connected to said cam means at a point located equal distances from the innermost and outermost positions of said second crank pin in the position of said rotary member in which said tool slide is in a dead center position before starting its return stroke, said connecting rod means turning said cam means an angular distance depending on the position of said second crank pin during turning of said rotary member; means connecting said cam means with said tool holder for turning the same depending on the turning angle of said cam means; and control means connected to said first and second crank pins for simultaneously moving said crank pins relative to each other and in radial direction of said rotary member for selected distances having such a ratio that said cam means turns through the same angular distance during a constant portion of the return stroke of said tool slide for cutting a fillet by a tool mounted on said tool holder after the tool has completed a straight cutting stroke moving with said tool slide.

11. An adjusting arrangement as set forth in claim 10 wherein said control means include first and second nut means respectively secured to said first and second crank pins, and threaded means having two threads of different pitch and being respectively in threaded engagement with said first and second nut means.

References Cited in the file of this patent
UNITED STATES PATENTS

| | | |
|---|---|---|
| 364,530 | Martin | June 7, 1887 |
| 2,090,507 | Zimmermann | Aug. 17, 1937 |
| 2,682,204 | Carlsen et al. | June 29, 1954 |
| 2,727,438 | Gack | Dec. 20, 1955 |